Dec. 27, 1955 C. B. DE VLIEG 2,728,248
FEED CONTROL MECHANISM FOR MACHINE TOOLS
Filed Aug. 20, 1952 7 Sheets-Sheet 1

Inventor
Charles B. De Vlieg
By McCanna & Morsbach
Attys.

Dec. 27, 1955 C. B. DE VLIEG 2,728,248
FEED CONTROL MECHANISM FOR MACHINE TOOLS
Filed Aug. 20, 1952 7 Sheets-Sheet 2
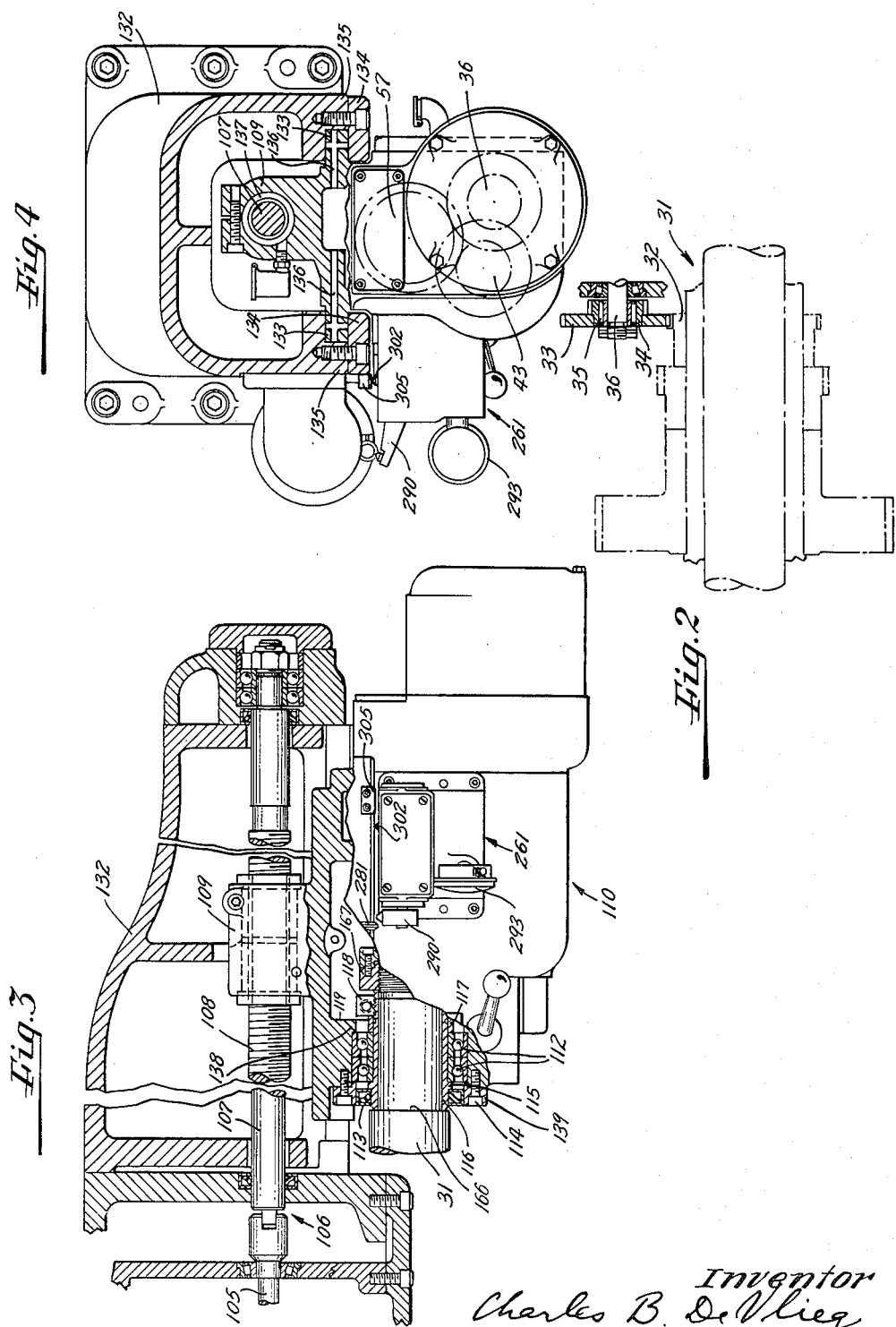
Inventor
Charles B. De Vlieg
By McCanna & Morsbach
Attys.

Dec. 27, 1955 C. B. DE VLIEG 2,728,248
FEED CONTROL MECHANISM FOR MACHINE TOOLS
Filed Aug. 20, 1952 7 Sheets-Sheet 3

Inventor
Charles B. De Vlieg
By McCanna & Morsbach
Attys.

Dec. 27, 1955  C. B. DE VLIEG  2,728,248
FEED CONTROL MECHANISM FOR MACHINE TOOLS
Filed Aug. 20, 1952  7 Sheets-Sheet 4
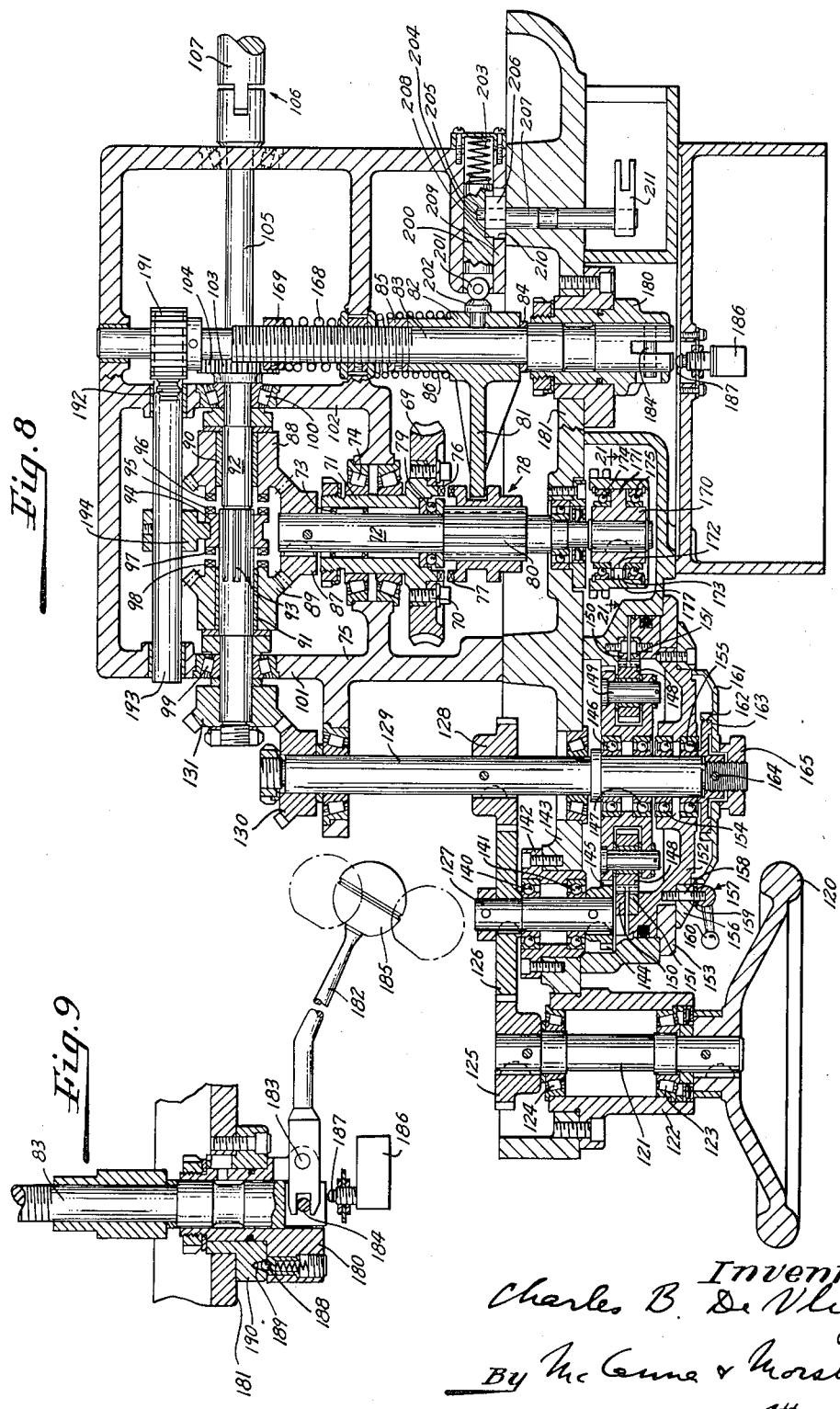
Inventor
Charles B. De Vlieg
By McCanna & Morsbach
Attys.

Dec. 27, 1955

C. B. DE VLIEG 2,728,248

FEED CONTROL MECHANISM FOR MACHINE TOOLS

Filed Aug. 20, 1952

Inventor
Charles B. De Vlieg
By McCanna & Morsbach
Attys.

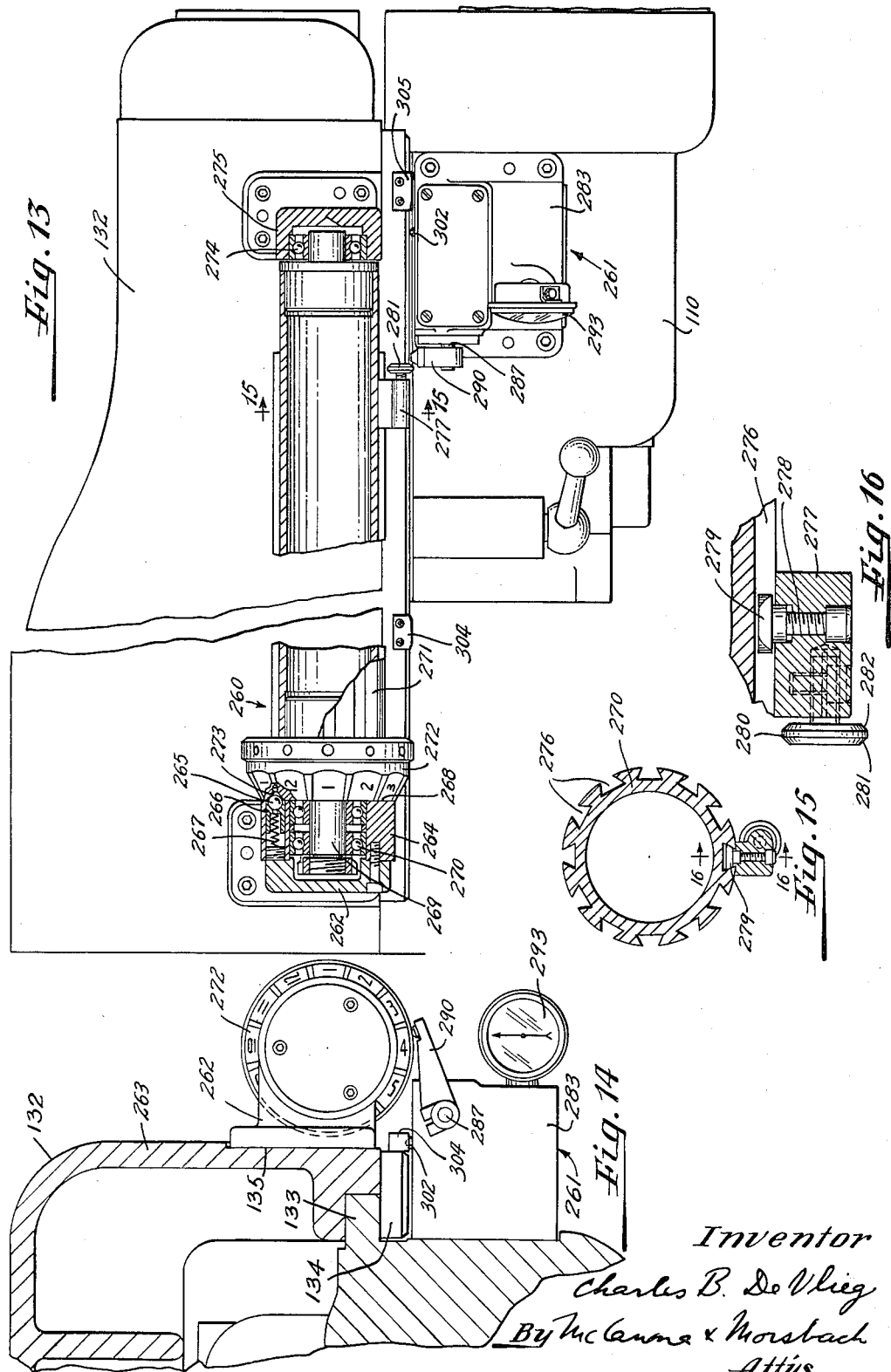

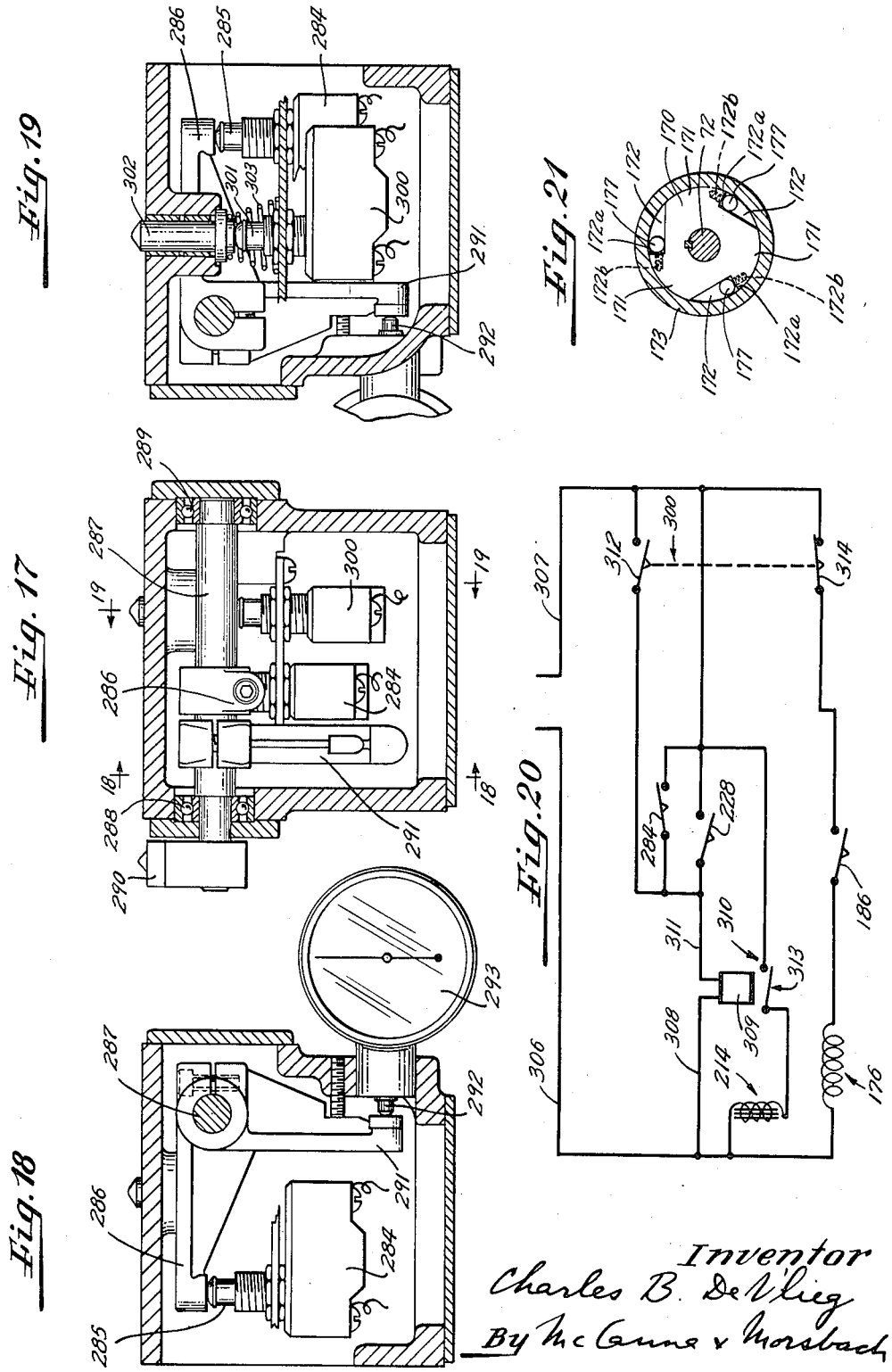

United States Patent Office 2,728,248
Patented Dec. 27, 1955

2,728,248

FEED CONTROL MECHANISM FOR MACHINE TOOLS

Charles B. De Vlieg, Farmington, Mich.

Application August 20, 1952, Serial No. 305,388

4 Claims. (Cl. 77—3)

This invention relates in general to mechanism for controlling the feed or traversing movements in a machine tool and it has more particular reference to controlling the travel of a machine tool spindle toward and from the work piece, or vice versa, for making cuts of predetermined depth on the work piece. The invention is particularly adapted to such a mechanism for use with horizontal boring and milling machines.

The common practice for years with horizontal boring machines in respect to the control of depth of the various operations to be performed usually includes the use of a scale indicating the general position of the spindle endwise and then a micrometer dial to provide the operator with a sensitive means for doing the final sizing of this operation. Also, it is the usual case when it is desired to control the depth of the hole or the shoulder in a hole as in the case of a mounting of an anti-friction bearing, to have the tool brought to the starting position. From there it is necessary for the operator to calculate the depth readings on both the scale and the micrometer dial for the final depth. It is the usual experience that the start of the cut is always in an odd relation with respect to the reading on the fixed scale. Also, boring work involves the boring of many holes from many positions in the same piece, and under the conditions of a plurality of such holes the marking of the scale and of the dial to handle a variety of such depths becomes a long tedious setting up operation and requires rather intricate and detailed operator attention to the readings in an effort to control the depths required. The wrong reading of any of these markings would result in an error in the work piece.

Furthermore, considerable skill and attention by the operator of a machine tool have been necessary for controlling the depth of feed of the spindle during counterboring, facing and back facing operations on a work piece. Commonly there is provided on machine tools of the boring and milling type a calibrated scale on the spindle slide for indicating the position of the spindle with respect to its fully retracted position. In addition there is also commonly provided a calibrated dial which is driven in response to movement of the spindle, so that by noting the position of this dial when the cutting tool carried by the spindle initially engages the work piece and by noting the amount the dial turns from this initial position as the cutting tool is fed into the work piece, the depth of cut of the cutting tool into the work piece may be determined by the operator. However, all of these operations require skill and continuous attention on the part of the operator in properly computing the desired depth of feed of the cutting tool, counting the dial revolutions and endeavoring to stop the drive to the spindle when the desired depth of cut has been completed. In the event that the operator either miscalculates the dial movement corresponding to the desired depth of cut or is inattentive in stopping the spindle drive at the completion of this cut, the work piece may be ruined. In addition, where the work involves multiple counterboring and facing operations, the operator is required to compute after each cutting operation the amount which the calibrated dial must be turned for the completion of the next cutting operation.

The present invention avoids these requirements, and thereby minimizes the skill and attentiveness now required of the operator of the machine, by providing novel control mechanism for automatically interrupting the feed of the cutting tool after a predetermined depth of cut has been made on the work piece.

For multiple counterboring and facing operations the present invention incorporates novel adjustable trip mechanism which may be preset to stop the feed of the cutting tool at predetermined successive positions for each of the cutting operations.

Accordingly, it is an object of the present invention to provide novel mechanism for automatically interrupting the power drive to the spindle holder at the completion of a predetermined precision depth of cut on a work piece by the cutting tool carried by the spindle.

Another object of this invention is to provide novel automatic trip mechanism for the spindle of a machine tool for stopping the feed of the cutting tool at any predetermined point to control the depth of feed of the cutting tool during counterboring, facing and back-facing operations on a work piece.

It is also an object of this invention to facilitate production work involving multiple counterboring and facing operations by providing a novel trip mechanism which is adjustable to any one of several positions for automatically successively stopping the feed of the cutting tool carried by the spindle of the machine tool at preselected precision positions corresponding respectively to the desired depth of cut for each cutting operation.

In the illustrative embodiment herein disclosed, this invention is characterized by the provision of a turret type control combined with a series of three dials, the first dial being arranged with means for re-setting so that in case an operator wishes to bore a hole to say a 2" depth he will set the first micrometer dial to zero position, the second dial being arranged to move in fixed relation with the spindle and serving to indicate the position of the spindle, and the third dial being arranged to be adjustable for setting to the desired precision depth by direct reading. With this arrangement, should the operator wish to bore a hole 2" deep he would set the third dial to the reading of 2" in relation to the vernier. This dial would then be locked, the feed engaged and the machine would continue in operation automatically until the tool spindle reached a depth of 2" less a few thousandths of an inch, then it would automatically disengage the feed so that the operator could finish the final depth of the hole by hand manipulation bringing the first micrometer dial to zero. In the case where there are many holes in a casting to be bored and where a plurality of depths are involved the operator will use the foregoing means for determining the depth. Then the operator will select one of the positions on the turret means and set the trip dog so that the indicator reading on the turret trip mechanism reads zero. This then becomes the depth control element for the first hole. On succeeding holes the operator would follow the same pattern and use the first mentioned means for setting the trips on the turret. After all of the trips on the turret are set for the holes for which they are intended the first mentioned means is no longer used. The trip elements on the turret function so as to automatically disengage the feed drive to the spindle at a point of 5 or 6 thousandths of an inch before the finish point at which place the feed is automatically disengaged allowing the operator to move the spindle to final position by hand and according to an indicator reading on the turret trip element. An important novelty however between previous uses of turret trip mechanisms and this invention is that in this invention the trip element can be actuated from a plurality of positions. The dial previously referred to as the first, trips exactly the same clutch and with exactly the same actuating device as when controlled by the turret depth control. A further important novelty is found in the ability of the mechanism to automatically effect the tripping function from a plurality of tripping positions, first with the dial and later with the turret. An advantage in this arrangement is that the first mentioned mechanism, namely the dial organization, is a very rapid means for determining depth, and following the determination of depth a setting of the trips on the turret are made with great rapidity. I have demonstrated that the set-up time with the present invention requires less than one fourth the time required with prior methods. Furthermore, close observation over a period of time has shown that the tension or strain on the part of the operator trying to obtain the desired depth control from marked scales, micrometer dials, and hand manipulation has been appreciable, whereas with the turret depth control of this invention the operator may proceed with confidence without the confusion growing out of so much dependence on his interpretation of marked scales and dials. In the present embodiment of this invention the actuating means used for tripping the feed is a solenoid so that the tripping is effected by energizing this solenoid. My experience with this mechanism has shown that the operation of the solenoid is so fast that the difference in the position at which it trips in the full range of relative speeds and feeds does not vary over 2 thousandths of an inch. In the illustrated embodiment described more fully hereinafter, the full range involves a top spindle speed of 1200 R. P. M. with a feed rate of 20 thousandths of an inch per revolution down to 25 R. P. M. of the spindle with a feed rate of 2 thousandths of an inch feed per revolution. This means that the mechanism is tripping within 2 thousandths of an inch with a range varying 480 to 1. With normal mechanical operations using prior constructions such an extreme ratio would effect a variable in the tripping of between $\frac{1}{16}$ and $\frac{1}{8}$ inch. With such accuracy as is provided by the solenoid mechanism herein disclosed it is also possible to set the trips so that the full depth of the cuts are realized without the final hand manipulation, and with such control of accuracy within the usual range of operation the machine will automatically control depths of shoulders in holes and the like to within less than ½ thousandth of an inch. This result in precision control has not been accomplished on any other type of prior machine, so far as I am aware. The present invention may be applied to milling and boring machines of types other than horizontal boring, milling and drilling machines. It may also be used on milling machines, particularly on vertical type machines which often have the problem of quick adjustments to a variety of heights of bosses on a given work piece. One of the novel features of the present invention is, therefore, a control mechanism of this type having a single trip element that can be tripped from many different control positions on a machine. Another novel feature is that the same trip means on the dial and the same trip means on the turret depth control will trip the feed going either forward or reverse so that the controlling of dimensions on the back facing of holes and gear cases is controlled with the same ease and facility as forward boring for ball bearing seats and the like. Additional novelty is in the type of trips that make it possible to trip for either direction of the feed. Further, the manner in which the dial indicator is associated with the trip on the turret depth control provides the advantage of having a fine visual control indicator reading for the control of depths in either forward boring or backfacing.

Other and further objects and advantages of the invention will be apparent from the following description of a preferred embodiment thereof, which is shown in the accompanying drawings to illustrate the principles and mode of operation of the invention.

In the drawings:

Fig. 2 is a fragmentary view showing the take off for the power feed drive to the spindle holder from the rotary spindle itself;

Fig. 3 is a fragmentary view, partly broken away, of the stationary spindle slide of the machine tool and the spindle holder thereat, showing the connection of the drive to the spindle holder;

Fig. 4 is an end view of the Fig. 3 assembly, with parts broken away to more clearly show the mounting of the spindle holder on the slide;

Fig. 8 is a sectional view showing the power feed drive from the Fig. 5 transmission to the spindle holder of Fig. 3, and also showing the manual drive to the spindle holder;

Fig. 9 is a fragmentary section showing the manual control for the clutch in the Fig. 8 power drive, which controls the connection of this power drive to the spindle holder;

Fig. 13 is a front view, with parts broken away, of the slide, spindle holder, the adjustable turret bar mounted on the slide, and the automatic positioning unit mounted on the spindle holder to be operated by the turret bar for automatically disconnecting the power feed drive to the spindle holder at successive positions predetermined in accordance with the positions of adjustable trips carried by the turret bar;

Fig. 14 is an end view of the Fig. 13 assembly, viewed from the left in Fig. 13;

Fig. 15 is a section along the line 15—15 in Fig. 13;

Fig. 16 is a fragmentary section showing the mounting of one of the trips on the turret bar of Fig. 13;

Fig. 17 is a transverse section through the automatic positioning unit mounted on the spindle holder in Fig. 13;

Figs. 18 and 19 are sections taken respectively along the lines 18—18 and 19—19 in Fig. 17;

Fig. 20 is a schematic circuit diagram of a portion of the control mechanism employed with the present invention; and Fig. 21 is a section along the line 21—21 in Fig. 8.

Figure 1:
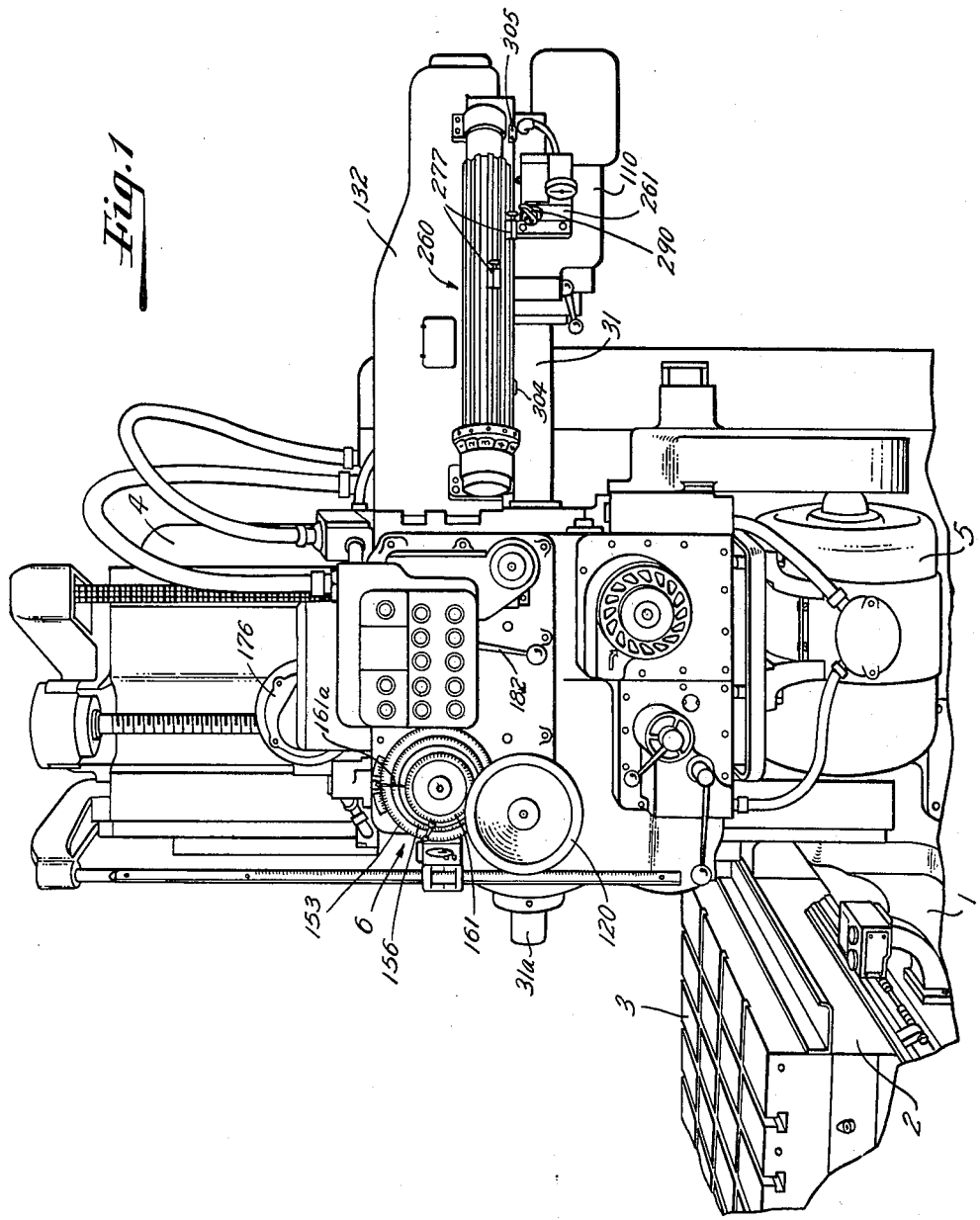
Figure 1 is a front perspective view of a horizontal boring and milling machine which incorporates the present invention.

Figure 1 illustrates a machine tool of the type used for both boring and milling operations which incorporates the present invention. The machine tool includes a base 1, a saddle 2 mounted on the base for reciprocation lengthwise of the base, and a work table or platen 3 mounted on the saddle 2 for reciprocation transversely of the base 1. At one side of the base 1 there is provided an upright column 4 supporting a stationary slide 132. The rotary spindle 31 at its forward end 31a extends toward the work table 3 and is constructed and arranged to support thereat a cutting tool (not shown) for performing boring and/or milling operations on a work piece (not shown) mounted on the work table 3. The spindle 31 is supported for longitudinal movement toward and away from the work piece by the spindle holder 110 mounted slidably on the slide 132. The spindle 31 and the cutting tool carried thereby are driven for rotation by the spindle drive motor 5 mounted on the base.

In accordance with the present invention there is provided an indicator dial assembly, indicated generally at 6 in Fig. 1, which is responsive to the drives to the spindle holder 110 by which the spindle 31 is moved longitudinally toward and from the work piece. This dial assembly includes a first dial 156 which is turned in response to the drives to the spindle holder 110 to give an indication of the position of the holder 110 and the spindle 31 with respect to their fully retracted positions on the machine tool. A second dial 153 is constructed and arranged to be normally disconnected from the drive to the spindle holder 110 and to be selectively connected to this power drive when the cutting tool first engages the adjacent front face of the work piece. Thereafter, this second dial 153 is turned in response to the power drive to the spindle holder to indicate the depth of feed of the cutting tool into the work piece. A trip dog is carried by the second dial and is arranged to operate a switch to interrupt the power drive to the spindle holder after the cutting tool has been fed a predetermined amount into the work piece. Thereafter, the final feed of the cutting tool into the work piece is effected by turning the hand wheel 120. In this final feed movement, the innermost dial 161 in the dial assembly is coupled to the manual drive to the spindle holder 110 to be turned in response to this drive for giving a precise indication of the final depth of feed of the cutting tool into the work piece. This dial assembly 6, whose construction and operation is described in detail hereinafter, provides for accurately controlling the depth of feed of the cutting tool during counterboring, facing and backfacing operations.

For production work involving multiple counterboring and facing operations to close limits, there is provided the adjustable turret bar 260 which is arranged to operate an automatic positioning unit 261 carried by the spindle holder 110. The turret bar 260 is mounted on the stationary spindle head 132 and carries a plurality of adjustable stops or trip dogs 277. The turret bar is mounted to be angularly adjustable about its longitudinal axis for selectively positioning a desired one of the trip dogs 277 in the path of movement of the operating lever 290 of the automatic positioning unit 261 as the spindle holder 110 is moved longitudinally along the slide 132 toward the work piece. When the operating lever 290 is engaged by this trip dog it operates a switch in the automatic positioning unit 261 to automatically interrupt the power drive to the spindle holder 110, whereby to automatically stop the power feed of the cutting tool into the work piece at a point predetermined in accordance with the position of the switch-operating trip dog 290 on the turret bar 260. Then, simply by turning the turret bar 260 to successively position different ones of the trip dogs in switch-operating position, successive different depths of cut may be effected during the following power drive feeds of the cutting tool.

With the general organization of elements of the present invention having been outlined above, each of the individual components of the assembly is described in detail in the following description to point out the construction and mode of operation of a specific preferred form of the present invention.

*Power drive to spindle holder*

Referring to Fig. 2, the rotary spindle, indicated generally at 31, carries a gear 32 which rotates in unison with the spindle and which meshes with the input gear 33 of the power drive from the spindle to the holder 110 which supports the spindle for movement axially into and from the work piece. The spindle is driven from a motor 5 (Fig. 1) in any desired manner. Gear 33 is carried on a sleeve 34 (Figs. 2 and 5) which is rotatably mounted by means of needle bearings 35 on the shaft 36. Spaced collars 37 and 38 are located at opposite ends of the sleeve 34 to locate the latter axially along shaft 36. Sleeve 34 at its inner end carries an integral gear 39 which meshes with a gear 40 formed on a sleeve 41 which is rotatably mounted, by means of needle bearings 42, on a shaft 43. Sleeve 41 also carries at its inner end remote from the gear 40 another gear 44 which is in mesh with a gear 45 splined to the input shaft 36. In this manner, the power input drive from the spindle 31 is imparted to the input shaft 36.

Figure 5:
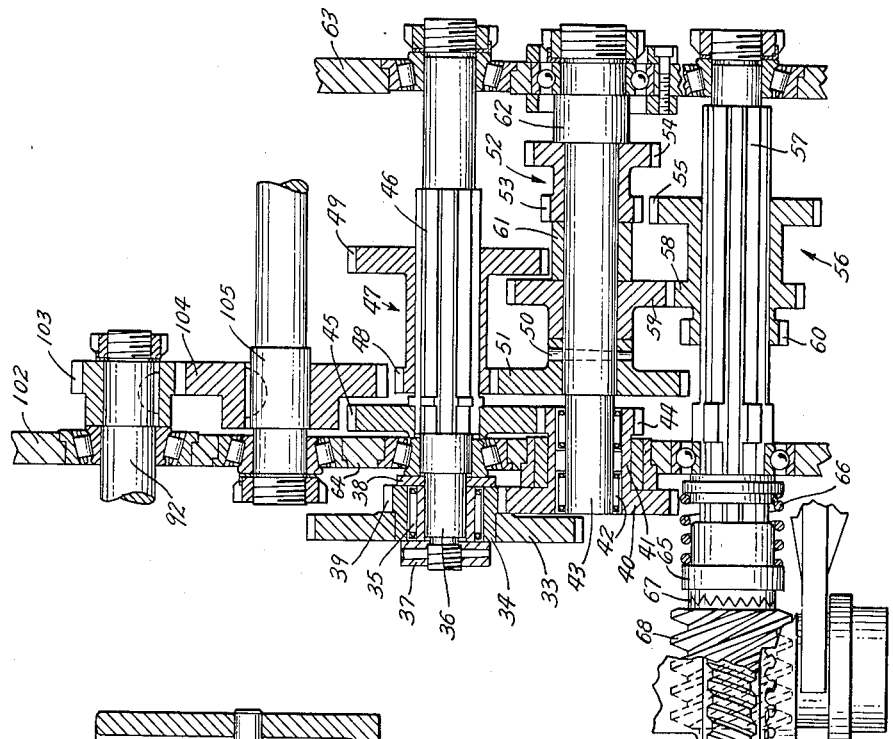
Fig. 5 is a view of the variable speed transmission in the power feed drive to the spindle holder, with the various parts being spread out in a single plane to illustrate schematically the various driving connections.

As best seen in Fig. 5, the input shaft 36 is longitudinally splined at 46 and a multiple gear unit 47 is shiftable axially along this splined portion of the shaft. The gear unit 47 carries at its opposite ends gears 48 and 49, which are of different diameters. Attached to the shaft 43 by means of a cross pin 50 is a gear 51, which meshes with the gear 48 in one extreme position of the gear unit 47 along the input drive shaft 36. An idler gear unit 52 is rotatably mounted on shaft 43 in spaced relation from the first-mentioned gear 51 thereon. This idler gear unit 52 includes a gear 53 which meshes with the gear 49 in the opposite extreme position of the gear unit 47 axially along the input drive shaft 36. Idler gear unit 52 also includes a gear 54 which meshes with a gear 55 on the gear unit 56, which is splined to shaft 57 to be shiftable longitudinally therealong, in one extreme position of the gear unit 56 along shaft 57. Gear unit 56 also carries an intermediate gear 58 which, when the gear unit 56 is in an intermediate position, meshes with another gear 59 attached to the gear 51 on shaft 43. Another gear 60 is carried on the gear unit 56 and is adapted to mesh with the gear 51 on shaft 43 when the gear unit 56 is shifted to its opposite extreme position along shaft 57. A spacer sleeve 61 is carried on the intermediate shaft 43 to properly space the gear unit 52 from the assembly of gears 59 and 60, and the intermediate shaft 43 is formed with an enlarged collar 62 which abuts against the opposite axial end of the gear unit 52. Each of the shafts 36, 43 and 57 is suitably supported for rotation between spaced stationary housing walls 63 and 64.

By suitable shifting forks the gear unit 47 may be shifted selectively along the first shaft 36 to a position in which its gear 48 meshes with the gear 51 attached to the intermediate shaft 43 or to another position in which its gear 49 meshes with the gear 53 on the gear unit 52 splined to the intermediate shaft 43. In like manner, the gear unit 56 may be shifted along the splined shaft 57 to selectively bring its gear 55 into mesh with the gear 54 of gear unit 52, or to position its gear 58 in mesh with the gear 59 on intermediate shaft 43, or to bring its gear 60 into mesh with gear 51 attached to intermediate shaft 43. Thus, for a given speed of rotation of the spindle 31, which imparts rotation to shaft 36 in the described manner, any one of six speeds of shaft 57 may be obtained by suitably shifting the gear units 47 and 56 in the above-described variable speed transmission.

Figures 6, 7:
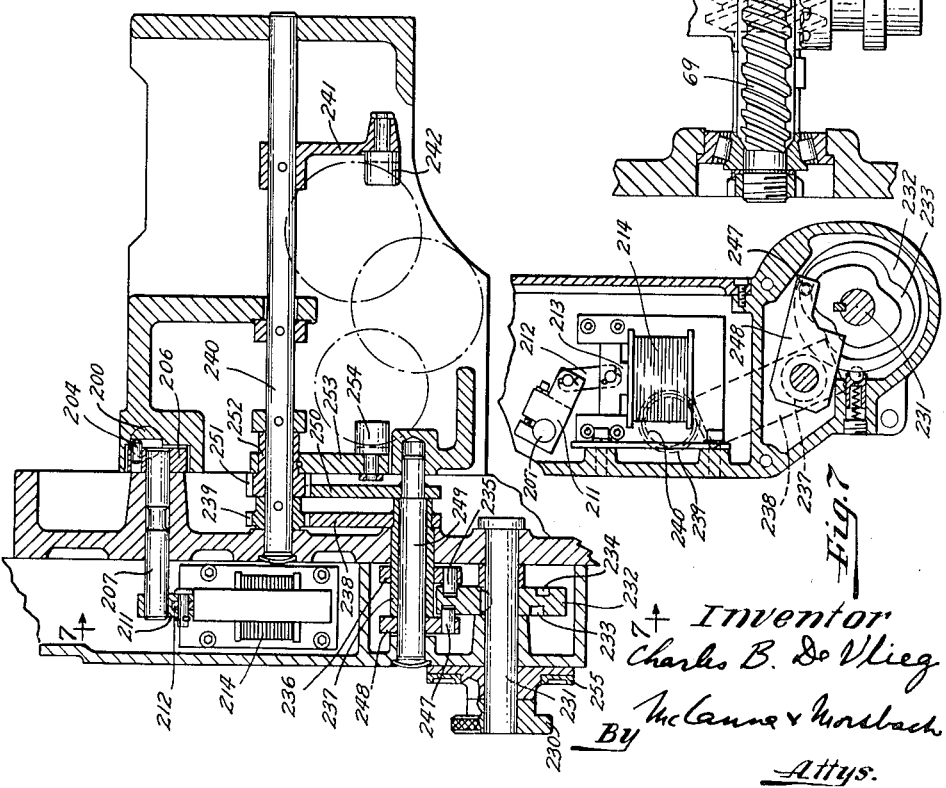
Fig. 6 is a longitudinal sectional view showing the manually operated control mechanism for the variable speed transmission of Fig. 5 and the solenoid-operated mechanism for controlling the clutch which connects the power feed drive to the spindle holder.
Fig. 7 is a section along the line 7—7 in Fig. 6.

For controlling the positions of the shiftable gear units 47 and 56 in the variable speed transmission, there is provided the adjustable dial 230 (Fig. 6) which is attached to a rotatably mounted shaft 231. Shaft 231 carries a cam member 232 formed with separate cam grooves 233 and 234 in its opposite end faces.

Coacting with the cam groove 234 is a pin 235 mounted on a cam follower 236 which is attached to a tubular sleeve 237. Toward its inner end sleeve 237 carries a segmental gear 238 which drives a gear 239 fastened to rotatable shaft 240. Shaft 240 carries a depending arm 241 upon whose lower end a shifter 242 is rotatably mounted. Shifter 242 engages the gear unit 47 and controls the latter's position along the splined portion 46 of shaft 36.

Coacting with the other cam groove 233 is a pin 247 carried by a cam follower 248. Cam follower 248 is attached to a rod 249 which extends rotatably through the tube 237. Adjacent its inner end the rod 249 carries a gear segment 250 which drives a gear 251. Gear 251 is formed with an integral sleeve 252 which loosely surrounds shaft 240. A depending arm 253 attached to sleeve 252 carries at its lower end a rotatably mounted shifter 254. Shifter 254 engages the gear unit 56 and controls the latter's position along the splined shaft 57.

By virtue of the foregoing mechanism, the angular position of control knob 230 controls the respective positions of the shifters 242 and 254 for suitably locating the shiftable gear units 47 and 56 to establish a drive through the Fig. 5 transmission for producing the desired speed of the output shaft 57. A fixed dial 255 is located adjacent the control knob 230 and is calibrated in terms of the linear speed of the spindle holder, which is driven through the described speed change mechanism from the spindle 31, for each particular angular setting of the control knob 230.

At its outer end, the splined shaft 57 in the Fig. 5 transmission carries a toothed clutch member 65 which is spring pressed by coil spring 66 into engagement with a mating clutch member 67 carried on a worm 68. Worm 68 drives a worm wheel 69 (Figs. 5 and 8).

As best seen in Fig. 8, the worm wheel 69 is attached by means of threaded bolts 70 to a clutch sleeve 71, which is rotatably mounted on shaft 72 by means of needle bearings 73. Suitable bearings 74 support the clutch sleeve 71 for rotation relative to the housing portion 75. At one end the clutch sleeve 71 is formed with a plurality of clutch teeth 76 which are adapted to engage mating clutch teeth 77 on a shiftable clutch member 78. Clutch member 78 is splined to a longitudinally splined portion 80 of shaft 72 so as to be shiftable axially therealong but not rotatable relative thereto. When the clutch member 78 is shifted to position its clutch teeth 77 in engagement with the clutch teeth 76, there is established a driving connection from the worm wheel 69 through this clutch arrangement to shaft 72 to impart rotation to the latter. Ball bearings 79 separate the clutch sleeve 71 axially from the splined portion 80 of shaft 72 and permit rotation of clutch sleeve 71 relative to shaft 72 when the clutch members 71 and 78 are out of engagement. Thus, in the foregoing manner there may be established from the output shaft 57 of the speed change transmission a drive to the shaft 72.

For controlling this drive, there is provided a shifter 81 connected to the clutch member 78 to control the latter's position along shaft 72 for selectively moving this clutch member into or out of engagement with the clutch sleeve 71. The mechanism for shifting the shifter 81 will be described in detail hereinafter.

Shaft 72 at one end carries a bevel gear 87 which drives two spaced bevel gears 88 and 89, which are rotatably mounted by means of journal sleeves 90 and 91, respectively, on a shaft 92. Between the bevel gears 88 and 89 the shaft 92 is splined longitudinally at 93 and carries a clutch member 94 which is shiftable along this splined portion of shaft 92. Clutch member 94 at one end is formed with clutch teeth 95 adapted to engage mating clutch teeth 96 formed on one end of the bevel gear 88 when the clutch member 94 is shifted axially to the right in Fig. 8. At its other end clutch member 94 is formed with clutch teeth 97 adapted to engage mating clutch teeth 98 formed on the adjacent end of the bevel gear 89. Thus, by shifting the clutch member 94 selectively into clutching engagement with the bevel gear 88 or 89, the shaft 92 to which clutch 94 is splined may be driven in either direction of rotation by the bevel gear drive from shaft 72. The mechanism for thus shifting the clutch member 94 to establish a "forward" or "reverse" drive to shaft 92 will be described in detail hereinafter.

Shaft 92 is suitably rotatably supported by bearings 99 and 100 located respectively in the spaced walls 101 and 102 of the housing portion 75. Shaft 92 extends through wall 102 and at the other side of this wall carries a gear 103 which drives a gear 104 keyed to shaft 105 (Figs. 5 and 8). Shaft 105, in turn, is coupled at 106 (Figs. 8 and 3) to the lead screw 107 which extends into the spindle head 132. The lead screw is formed intermediate its length with screw threads 108 which are threadedly received in a portion of the spindle holder 110.

The spindle holder 110 (Fig. 4) is formed with laterally extending arms 133 shaped to be supported on gib plates 134 secured to the bottom faces of the side walls 135 of the spindle slide 132. The plates 134 are disposed in a horizontal plane and in effect define ways along which the arms 133 of the spindle holder are free to reciprocate. Suitable lubrication passages 136 are formed in the arms 133 to provide lubrication between the arms 133 and the plates 134. At its top the spindle holder 110 is formed with a split collar 109 shaped to support the components of a lead screw nut assembly 137 for receiving the threaded portion 109 of the lead screw 107. By virtue of the foregoing construction, upon rotation of the lead screw 107 the spindle holder 110 is moved lengthwise of the slide 132 in a direction toward or away from the work piece, depending upon the direction of rotation of the lead screw.

The spindle 31 is mounted for rotation relative to the holder 110 and for movement axially in unison therewith. The forward end of the spindle is supported for rotation in a conventional manner, the details of this support being omitted for the purpose of simplifying the drawings. The rear end of the spindle 31 is supported by ball bearings 112 journaled in the holder 110. These ball bearings are disposed between a shoulder 115 formed on a collar 116 mounted on the spindle and a spacer 117 mounted on the opposite end of the collar 116. A nut 118 screwed onto the inner end of the collar 116 engages the spacer 117 and maintains the inner races of the bearings 112 and the collar 116 in tightly assembled relation. This construction also hold the bearings 112 against movement axially relative to the collar 116. The outer races of the bearings 112 are received in an annular recess formed in the front end wall 119 of the spindle holder 110. The outer races of the bearings 112 are retained between a shoulder formed in the front wall 119 of the slide and a retainer 139 secured to the front face of the front wall 119 by means of screws 114. An oil seal 113 is supported in the retainer 139 to prevent leakage of lubricant from the holder 110. The collar 116 is supported on the rear end of the spindle 31, which is of reduced size to form a shoulder 166. One axial end face of the collar 116 abuts against the collar 116 and the opposite ends of the collar is engaged by a nut 167 threaded onto the reduced end of the spindle. In this manner, the spindle 31 is maintained fixed axially with respect to the holder 110 while being free to rotate relative to the holder.

By virtue of the foregoing mechanism, the cutting tool which is carried at the front end of spindle 31 may be driven "forward" (toward the work piece) or "reverse" (away from the work piece) by means of the above-described power drive from the spindle. The positions of clutch members 78 and 94 determine whether this power drive is established. The direction of this drive ("forward" or "reverse") depends upon the position of the clutch member 94. Dial 230 controls the speed of this drive.

*Manual drive to spindle holder*

While the power drive from the spindle is ideally suited for effecting the major portion of the cutting operation of the cutter, still it is desired to complete this cutting operation by mechanism which is directly and instantaneously under the operator's control. To this end, there is provided in the illustrated embodiment of the present invention a drive from the hand wheel 120 to the spindle holder 110, so that by turning this hand wheel the operator may move the cutting tool held by the spindle to its final depth of cut in the work piece.

Referring to Fig. 8, the hand wheel 120 is keyed to a shaft 121 which is journaled for rotation in a housing sleeve 122 by means of the spaced roller bearing assemblies 123, 124. At its opposite end shaft 121 carries a gear 125 which meshes with a gear 126 keyed to the rotary idler shaft 127. In turn, gear 126 drives a gear 128 which is keyed to a shaft 129. Shaft 129 at its inner end carries a bevel gear 130 which meshes with a bevel gear 131 secured to the previously described shaft 92.

Thus, when the hand wheel 120 is turned it imparts rotation to the shaft 92 through the gear drive 125, 126, 128, 130, 131, and in turn shaft 92 drives the spindle holder 110 in the power drive from the spindle to the spindle holder 110. Obviously, the direction in which the hand wheel 120 is turned determines the direction in which the spindle holder 110 is driven.

*Rapid traverse drive to spindle holder*

For initially moving the cutting tool toward the work piece and in the final retracting movement of the cutting tool away from the work piece, there is provided a rapid traverse drive in the present invention.

From a motor 176 (Fig. 1) there is provided a single-direction rapid traverse drive to the shaft 72, this rapid traverse drive being in effect only when the clutch 76, 77 is disconnected to thereby disconnect the power feed drive to shaft 72.

Referring to Fig. 8, the sprocket 173, which extends about the outer end of shaft 72, is suitably driven from motor 176. Shaft 72 has a pawl member 170 keyed to its outer end. By means of this pawl member the rapid traverse drive from motor 176 to shaft 72 may be imparted in one direction of the drive from motor 176. Intermediate its length, the pawl member 170 is formed with three spaced radial arms 171 (Fig. 21) which have arcuate outer faces shaped to permit the inner face of the sprockets 173 to slide freely over the pawl member. Between these radial arms 171 the pawl member 170 is cut away at its periphery as shown in Fig. 21 to provide recesses 172 for receiving rollers 177. At these recesses there are formed shoulders 172a against which the rollers 177 are adapted to abut. Coil springs 172b tend to force the rollers 177 outwardly away from the shoulders 172a and into snug engagement with the internal wall of the sprocket 173.

In the operation of this mechanism, when the sprocket 173 is driven clockwise in Fig. 21, by its rotation it tends to draw the rollers 177 outwardly away from their respective stops 172a and to wedge these rollers between it and the pawl member 170, thereby establishing a friction drive to the shaft 72. In the opposite direction of rotation of the sprocket 173 the balls 177a are urged toward their respective stops 172a on the pawl member, at which there is sufficient clearance for the sprocket 173 to permit it to rotate without imparting rotation through the rollers 177 to the pawl member 170.

While the illustrated embodiment of the invention has a single direction drive from the motor 176 to shaft 72, it is to be understood that this may be dispensed with if the motor 176 is arranged to operate in only one direction. In the latter case, the sprocket 173, which is driven from motor 176, can be made solid on shaft 72.

*Indicator dial movement in response to movement of spindle holder*

In accordance with the present invention, there is provided a series of indicator dials which respond to the movement of the spindle holder. In one form of the present invention, these indicator dials may be pre-set to automatically trip an electric switch after the cutting tool held by the spindle has produced a certain depth cut by means of the power drive to the spindle holder 110. The tripping of this switch causes the power drive to the spindle holder to be disconnected, so that the final drive to the spindle holder must be effected through the hand wheel 120. The indicator dials also respond to the hand wheel drive in the final positioning of the spindle holder so as to indicate accurately the final depth to which the cutting tool has been fed.

Figure 11:
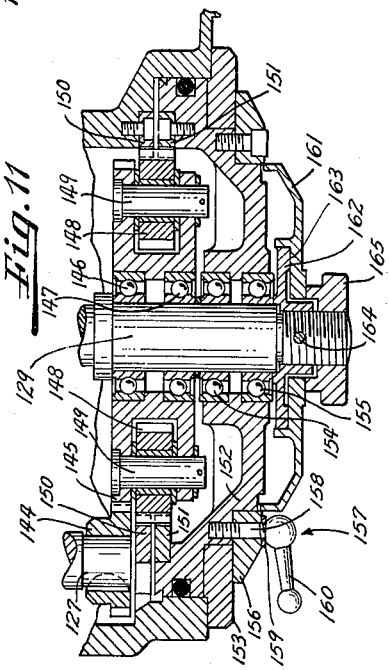
Fig. 11 is a section through the Fig. 10 assembly, taken along the line 11—11 in Fig. 10.

Referring to Fig. 8, the shaft 127 is rotatably supported by means of spaced ball bearing assemblies 140, 141 in a sleeve 142 fixed to the housing wall 143. At its outer end remote from gear 126 the shaft 127 carries another gear 144 which meshes with an annular gear 145, which is mounted by means of ball bearing assemblies 146, 147 to rotate about shaft 129 (Fig. 11). Two of planetary gears 148 are rotatably carried on opposite sides of the annular gear 145, these planetary gears being rotatably mounted on cross pins 149 carried by the annular gear 145. The planetary gears 148 have a portion of their respective circumferences projecting beyond the periphery of the annular gear 145. Each of the planetary gears 148 meshes with an inner annular gear 150, which is fixedly attached to the housing, and an outer annular gear 151 attached to the body 152. The outer annular gear 151 has two more teeth than the fixed inner annular gear 150, so that it is turned angularly with respect to the housing in response to rotation of shaft 127. Thus, for each full direction of the annular gear 145 imparted by shaft 127 through gear 144, the body 152 is turned angularly an amount corresponding to two teeth on the outer annular gear 151.

The amount of rotation of shaft 127 corresponds to the amount of rotation of shaft 92, through which the spindle holder 110 is driven, whether the drive to the spindle holder is the power drive from the spindle 31 or the manual drive from the hand wheel 120. Obviously the gear arrangement just described provides a speed reduction drive for turning the body 152 in response to the drive to the spindle holder 110.

The body 152 is rotatably supported on shaft 129 by means of spaced ball bearing assemblies 154, 155.

The body 152 carries a large annular dial 153 which may be adjusted angularly about the body 152. An intermediate annular dial 156 is bolted to the body 152 to move in unison therewith. A clamp 157, which includes a threaded bolt 158, washer 159 and handle 160, is provided for releasably clamping the intermediate dial 156 to the large dial 153. When this clamp is turned to cause clamping engagement between the intermediate and large dials the large dial is caused to turn in unison with the body 152, along with the intermediate dial 156. When the clamping pressure is relieved, the outer dial 153 may be turned relative to the body 152 for a purpose which will appear hereinafter.

The dial assembly also includes a small central dial 161 which may be caused to rotate at a relatively high rate of speed in unison with shaft 129. A plate 162, which is formed with an annular outer friction face 163 is attached by means of a cross pin 164 to the shaft 129 adjacent the outer end thereof. A nut 165 is threaded onto the outer end of shaft 129 and bears against the outer face of the small central dial 161 to press the latter into frictional engagement with the aforementioned friction face on plate 162 when it is desired to rotate the inner dial in unison with shaft 129. By relieving the clamping pressure of nut 165, the inner dial 161 may be released from its driving connection to shaft 129, so as to remain stationary while shaft 129 rotates.

The respective purposes and mode of use of each of the dials 153, 156 and 161 in the dial assembly will be apparent from the description of the operation of the invention which follows.

Control mechanism for power drives to spindle holder

As previously stated, the shiftable clutch member 78 is operable to establish a power drive from the spindle 31 to the spindle holder 110. This drive is established when the cutting tool carried by the spindle is being fed into the work piece to perform a cut thereon.

Shifter 81 which controls the position of the clutch member 78 is carried on a sleeve 82 which is loosely positioned on shaft 83. Spaced collars 84, 85 attached to shaft 83 abut against opposite ends of sleeve 82 to move the latter axially in unison with shaft 83. A compression coil spring 86 acts against the sleeve 82 to bias the shifter 81 to position the clutch member 78 out of engagement with the clutch sleeve 71 on which the worm wheel 69 is carried. An opposing compression coil spring 168 acts against a collar 169 on shaft 83 to bias the shaft toward its axial inward position. However, the force of spring 168 is less than that of spring 86, so that the shaft 83 is normally biased to its axial outward position.

The position of shifter 81 is controlled by moving the shaft 83 axially in or out. The outer end of shaft 83 extends through a sleeve 180 which is mounted to be restrained against axial movement with respect to the front wall 181 of the housing (Fig. 9). An operating lever 182 is pivotally mounted on a cross pin 183 carried by sleeve 180. At its inner end the lever 182 is bifurcated to extend on opposite sides of a cross pin 184 carried by shaft 83 at its outer end. By means of this pivotal interconnection between the operating lever 182 and shaft 83, when the handle 185 of the operating lever is shifted toward the front wall 181 of the casing the shaft 83 is moved axially outward and carries the shifter 81 in the same direction to disconnect clutch member 78 from the spindle drive. Conversely, when the handle 185 of the operating lever is shifted outwardly in a direction away from the front wall 181 of the housing, the shaft 83 is moved axially inward and carries the shifter 81 in the same direction to shift the clutch member 78 into clutching engagement with the clutch sleeve 71 to establish a drive from the spindle 31 to shaft 72.

A normally open, small, precision, snap-acting switch 186 has its operating plunger 187 positioned to be engaged by the outer end of shaft 83 when the latter is shifted axially outward. When this occurs, switch 186 is closed and completes the energization circuit for the auxiliary motor 176 which drives sprocket 173.

Thus, when the shaft 83 is shifted outwardly by suitable manipulation of the operating lever 182, two actions occur: auxiliary motor 176 is energized and a high speed "rapid traverse" drive from this motor to the spindle holder 110 is established through the sprocket 173, and the clutch member 78 is positioned to disconnect the power drive from the spindle 31 to the spindle holder 110.

As previously mentioned, the shiftable clutch member 94 (Fig. 8) controls the direction of the drive to the spindle holder 110, that is, whether the spindle holder is to be driven "forward" or "reverse." Operating lever 182, in addition to its previously described functions, also shifts clutch member 94 to establish a "forward" or "reverse" direction of the drive to the spindle holder 110 in the following manner: Sleeve 180, to which operating lever 182 is attached, carries a spring-pressed ball 188 which is positioned to seat in a recess 189 formed in the front face of the stationary sleeve 190 attached to the front wall 181 of the housing. This spring-pressed ball arrangement permits the sleeve 180 to be turned angularly about its own axis in either direction when the operating lever 182 is turned in that direction. This turning of the operating lever 182 also turns the shaft 83 angularly about its own axis in the same direction. At its inner end, shaft 83 carries a transverse worm wheel 191 (Fig. 8) which meshes with a worm 192. Worm 192 is carried on a longitudinally shiftable rod 193 which carries a shifter 194, which engages the clutch member 94 to control the latter's position. Thus, by turning the shaft 83 in the proper direction the clutch member 94 may be shifted selectively into engagement with the clutch faces carried by the respective bevel gears 88, 89 so as to establish either a "forward" or a "reverse" drive to the spindle holder. The spring-pressed ball arrangement at 188, 189 forms a releasable lock for normally maintaining the lever 182 in its neutral position, in which the clutch member 94 is out of engagement with the clutch face of either of the adjacent bevel gears and the power drive to the spindle holder disconnected.

For locking the shifter 81 into its inward position establishing the drive from spindle 31 to shaft 72, there is provided a reciprocable plunger 200 (Fig. 8) which carries a roller 201 adapted to engage the enlarged head 202 of a bolt attached to the sleeve 82 of the shifter. After the shifter 81 has been moved to its innermost position, to move clutch 78 into engagement with clutch sleeve 71, the plunger 200 is urged by a compression coil spring 203 to position the roller 201 so as to block the protruding head 202 and the shifter sleeve 82 from moving back away from this position. The clutch member 78 is locked in clutching position until the plunger 200 is retracted against the force of coil spring 203.

For retracting plunger 200 there is provided a pin 204 which is snugly received in a recess 205 formed in the plunger 200. The pin 204 is mounted on an angularly turnable enlarged head 206, which is attached to the inner end of a rotatably mounted rod 207. The plunger 200 is cut away at 208 and the housing wall 209 is cut away at 210 to permit the head 206 to operate thereat. Since the pin 204 is located eccentric with respect to the axis of rod 207, it will be apparent that the rod 207, by being turned in the proper direction causes the pin 204 to retract the plunger 200 against the force of spring 203.

Rod 207 is attached to a yoke 211 (Figs. 6 and 7) which is pivotally connected to a linkage 212 (Fig. 7), which in turn is pivotally connected to the reciprocable armature 213 of a solenoid 214. The arrangement is such that when the solenoid 214 is energized, it pulls the armature 213 down and this movement of the armature through the linkage 212, 211 causes the rod 207 to turn in a direction to cause the pin 204 to retract the plunger 200. Thus, when the solenoid 214 is energized the roller 201 is retracted away from locking engagement with the shift 81 and the latter is released from the position in which it had been locked for maintaining the drive from spindle 31 to shaft 72. Coil spring 86 returns the shifter 81 to its neutral position in which the spindle drive is disconnected from shaft 72.

The energization of solenoid 214 may be controlled by the large dial 153 of the dial assembly so as to disconnect the power drive from the spindle 31 to the spindle holder 110 after the cutting tool carried by the spindle has made a cut of a predetermined depth in accordance with the setting of the large dial 153.

Figure 12:
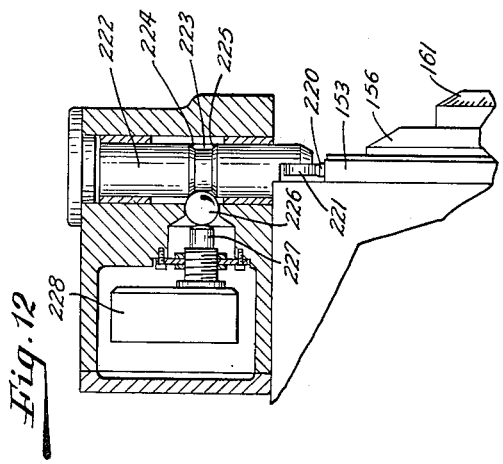
Fig. 12 is a section showing the switch and switch operator controlled by the Fig. 10 dial mechanism taken along the line 12—12 in Fig. 10.

To this end (referring to Figs. 10 and 12) the large dial 153 carries a trip dog 220 which is adapted to engage a roller 221 mounted on a retractable plunger 222. Plunger 222 is formed intermediate its length with a cut away annular groove 223 having spaced tapered end walls 224, 225 in which a ball 226 is normally seated (Fig. 12). At the other side of the ball 226 is located the reciprocatory operating plunger 227 of a normally open, precision, snap acting switch 228 which controls the energization of solenoid 214. A compression coil spring 229 (Fig. 10) normally biases plunger 222 to position the plunger groove 223 to receive the ball 226, so that the ball 226 normally exerts no force against the switch plunger 227 and switch 228 normally is open. However, after the large dial 153 has moved around to position the trip dog 220 in engagement with roller 221, the plunger 222 is thereby lifted slightly against the force of its bias spring 229 and the tapered lower end wall 225 of the plunger groove 223 cams the ball 226 toward the switch plunger 227, so that the switch plunger is pushed inwardly to close switch 228 and energize solenoid 214. This energization of solenoid 214 disconnects the power drive from the spindle 31 to the spindle holder 110, as described. This, in turn, stops the turning of the large dial 153 and the trip dog 220 is held in its switch-closing position.

Operation

In the operation of the foregoing mechanism, initially the spindle holder 110 is in a retracted position to maintain the cutting tool carried by the spindle away from the work piece. To move the cutting tool forward into engagement with the work piece, the operating lever 182 is shifted from its neutral position to its "rapid traverse-forward" position. This is done by moving the handle 185 of the operating lever inwardly toward the front wall 181 of the housing and angularly in a clockwise direction. This movement of the operating lever 182 causes the shaft 83 to be pulled outwardly to close switch 186 and thereby energize the auxiliary motor 176 for driving shaft 72 through sprocket 173. Also, this outward movement of shaft 83 moves the shifter 81 to retract clutch member 78 away from clutch sleeve 71 to thereby disconnect the power drive from spindle 31 to shaft 72. The angular turning of the operating lever 182 clockwise similarly turns shaft 83 in the same direction and through the worm arrangement 191, 192 causes the shifter 194 to shift clutch member 94 to the left into engagement with the clutch 98 on bevel gear 89, so that a "forward" drive is established from shaft 72 through bevel gears 87, 89 and the clutch 94 to drive the shaft 92 in a direction for moving the spindle holder 110 toward the work piece.

This rapid traverse drive from the auxiliary motor 176 also drives the shaft 127, which in turn, drives the intermediate dial 156. The zero setting of the intermediate dial 156 corresponds to the fully retracted position of the spindle holder 110 along the slide 132. Since the angular position of the intermediate dial is fixed with respect to shaft 127, and since shaft 127 is driven at all times that the spindle holder 110 is driven, it is clear that the intermediate dial 156 gives a direct indication of the distance which the spindle holder 110 has been advanced from its fully retracted position along the slide 132. Preferably the intermediate dial is calibrated in terms of the linear distance of longitudinal movement of the spindle holder 110, spindle 31 and the cutting tool carried by the spindle.

After the cutting tool has been advanced rapidly to the point where it just engages the work piece, the operating lever 182 is shifted back to its neutral position so as to permit switch 186 to open and de-energize the auxiliary driving motor 176, which is used for the rapid traverse positioning of the cutter. The rapid traverse drive to the spindle holder 110 is thus stopped and the cutter stops at this point.

Figure 10:
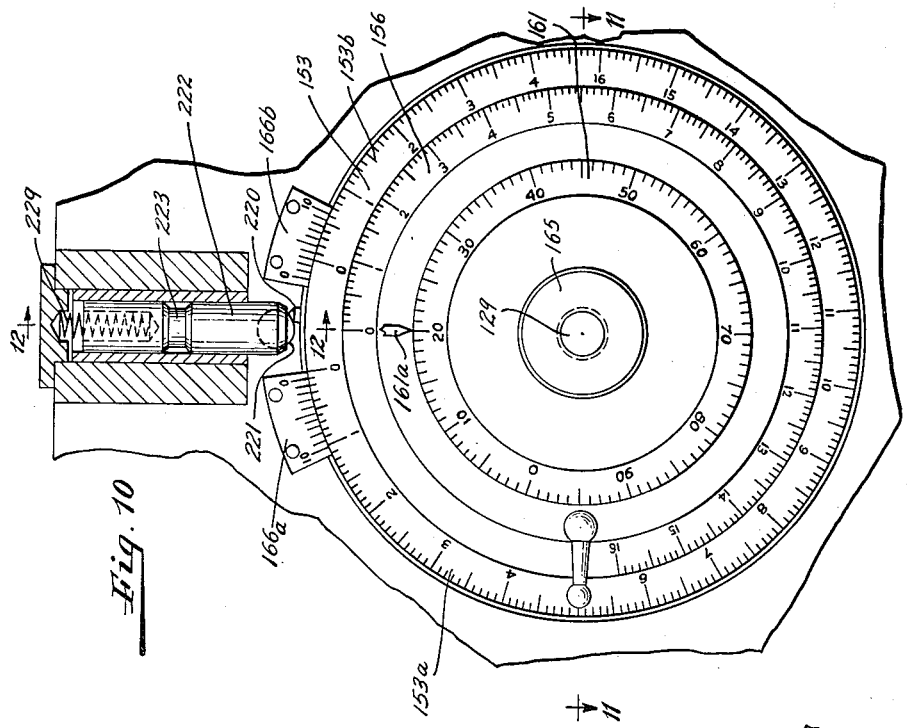
Fig. 10 is a front view of the indicator dial assembly associated with the Fig. 8 drive mechanism and arranged to be responsive to said drive mechanism for indicating and controlling the feed of the spindle holder.

Next, the clamp 157 for the large dial 153 of the dial assembly is loosened and this dial is turned to set the trip dog 220 so that it will close switch 228 and disconnect the power drive from the spindle 31 to the spindle holder 110 just before the completion of a predetermined depth cut in the work piece. Preferably the large dial 153 is calibrated in inches of feed of the cutter. Thus, if it is desired to feed the cutter into the work piece for a depth of seven inches by means of the power drive from the spindle, then the large dial 153 would be turned to position the calibration "7" on its "forward" scale 153a in register with the zero line on the fixed vernier 166a (Fig. 10). Then, the outer dial 153 is clamped by means of clamp 157 so as to turn in response to rotation of shaft 127. At this time, the inner dial 161 is turned to position its zero calibration in line with a fixed pointer 161a (Fig. 10), after which the nut 165 is tightened and the inner dial 161 is thereby arranged to be driven from shaft 129.

After the cutter has been fed slightly less than seven inches into the work piece by means of the power feed drive from the spindle the outer dial 153 will have been turned angularly a corresponding distance until the trip dog 220 engages the roller 221 on plunger 222 to close switch 228 to thereby disconnect the power drive from the spindle to the spindle holder 110, as described. Thus, closing of switch 228 energizes solenoid 214, which retracts its armature 213 and through the linkage 212, 211, rod 207 and eccentric pin 204 retracts the locking plunger 200 and permits the shifter 81 to be moved by spring 85 to disconnect clutch 78 from the clutch sleeve 71.

To establish this power feed drive from spindle 31 to the spindle holder 110, the handle 185 of the operating lever 182 is shifted outward away from the front wall 181 of the housing and clockwise from its neutral position. This outward movement of the lever handle causes the shaft 83 to be pushed inward axially against the force of coil spring 86. Shifter 81 is carried by shaft 83 to move the clutch member 78 into engagement with the clutch sleeve 71, so that a drive is established from spindle 31 through the speed change transmission and thence through worm wheel 69 and the clutch 71, 78 to shaft 72. The speed setting dial 230 will have been turned to give the desired output speed from the speed change transmission. The turning of the operating lever clockwise shifts the slidable clutch 94 from its neutral position into engagement with the clutch teeth 98 on bevel gear 89 to establish a "forward" drive from shaft 72 to shaft 92.

While the power feed drive from the spindle 31 to the spindle holder 110 is in effect, the shaft 127 is caused to rotate in response to this drive by means of the described auxiliary drive through shaft 92, bevel gears 131 and 130, shaft 129, and gears 128 and 126. In turn, shaft 127, through the speed reduction transmission formed by gear 144, rotary annular gear 145, planetary gears 148, fixed annular gear 150, movable annular gear 151 and the body 152, effects angular movement of the large dial 153 of the dial assembly since this outer dial is not clamped to the body 152 to move in unison therewith. Thus, the large dial 153 moves in response, and in proportion to, the movement of the spindle holder 110 during this feed drive. After the cutter has been fed into the work piece just short of the depth for which the large dial 153 was pre-set, the large dial will have been turned to position its trip dog 220 to cause switch 228 to close.

It is to be understood that the intermediate dial 156 of the dial assembly is also turned during the power feed drive from the spindle 31 to the slide 110. However, since this intermediate dial is not adjustable with respect to the body 152, it will be apparent that it indicates distance which the spindle holder 110 has moved away from its fully retracted position along the slide 132. On the other hand, the large dial 153 of the dial assembly is concerned only with the depth of cut on the work piece from any desired reference point on the work piece, such as the front face of the work piece.

In the operation of the dial assembly, the location of the trip dog 220 carried by the outer dial 153 is such that it engages the roller 221 to close switch 228 about 8/1000 of an inch short of the depth of cut for which the outer dial has been preset. Thus, the switch 228 will close to disconnect the power drive to the spindle holder 110 before the zero calibration on the forward scale of the outer dial 153 is directly aligned with the zero on the fixed vernier 166.

The final feed of the cutting tool is accomplished through the above-described drive from hand wheel 120. The completion of the desired depth of cut may be determined either by noting the alignment of the zero calibration on the outer scale with that on the fixed vernier 166a or by aligning the zero calibration on the inner dial 161 with the fixed pointer. Since the inner dial 161 is calibrated in terms of each 1/10,000 inch linear advance of the spindle holder (one full revolution of the inner dial representing a 1/10 inch advance of the spindle holder), the latter method is more precise and is therefore preferable.

The outer dial 153 also carries a "reverse" scale 153b which has a zero calibration adapted to be aligned with the zero calibration on the fixed vernier 166b for positioning the spindle holder in the reverse direction during backfacing operations and the like. As in the forward direction, the trip dog is arranged to trip the switch 228 and interrupt the power feed drive about 5/1000 inch short of the desired depth of feed in the reverse direction. The final feed is effected through the drive from the hand wheel 120.

*Turret bar mechanism for multiple operations*

The present invention also incorporates a novel mechanism which facilitates the performance of the same successive cuts of different depths on several work pieces. For this purpose, there is provided an angularly adjustable turret, indicated generally at 260 in Fig. 13, which is fixedly mounted on the casing of the machine. This turret carries a plurality of stops or trip dogs each of which is adapted to be moved successively into operative position for controlling the power feed drive from the spindle to the spindle holder when the turret is adjusted angularly to the desired position. An automatic positioning unit, indicated generally at 261, is mounted on the spindle holder 110 to move in unison therewith. The positioning unit 261 includes a switch adapted to be tripped by the trip dog which is in the operative position on the turret after the cutter has been fed into the work piece a predetermined amount. This switch controls the energization of solenoid 214 to disconnect the power feed drive to the spindle holder when such tripping action occurs.

Referring to Figs. 13-19, the turret assembly includes a mounting bracket 262 bolted to the side wall 135 of the spindle head 132. An annular sleeve 264 (Fig. 13) is bolted to the bracket 262. At one angular location on the sleeve 264 there is provided a spring-pressed ball arrangement which includes a ball 265, a slidable hollow plunger 266 providing a semi-spherical seat for the inner end of the ball, and a compression coil spring 267 which acts against the plunger 266 to bias the ball 265 beyond the front face 268 of the annular sleeve 264.

A shaft 269 is mounted by means of ball bearings 270 for rotary movement relative to the fixedly mounted annular sleeve 264. Attached to the shaft 269 is a turret 271 which carries an enlarged circular head 272, which abuts against the front face of the fixed annular sleeve 264. The turret head 272 is formed at its outer face with a plurality of recesses 273 positioned to selectively receive the ball 265, depending upon the angular position to which the turret 270 has been turned. When the spring pressed ball 265 snaps into one of these recesses 273 there is established a releasable interlock between the turret 270 and the turret holder 262 to maintain the turret in this particular angular position. When it is desired to turn the turret 270 to a different angular position, the manual force applied to the turret will overcome this releasable interlock and permit the turret to be turned to the next position. Suitable indicia, corresponding in the number to the number of ball receiving recesses 273 in the turret head, are provided on the turret head to indicate to the operator of the machine the angular position to which the turret has been turned. At the opposite end of the turret ball bearings 274 carried in a holder 275 fixed to the side wall 135 of the spindle head 132 rotatably support the opposite end of the turret shaft 269.

As best seen in Fig. 15, the turret 270 around its circumference is formed with a plurality of longitudinally extending ways 276, which correspond in number and position to the several angular positions at which the turret may be locked. In each, or as many as desired, of these ways there may be mounted a trip dog assembly which includes a holder 277 (Fig. 16), a bolt 278 threadedly received in the holder 277 and formed with an enlarged head 279 received snugly in the turret way 276, and a circular head 280 mounted on the holder 277 to extend beyond the rear end thereof. The head 280 is formed at its opposite end faces with beveled edges 281, 282. Each of these trip dogs is positioned by the operator of the machine along its turret way at a distance corresponding to the particular depth of cut at which it is desired to disconnect the power feed drive to the spindle holder in a manner to be described in detail hereinafter.

The automatic positioning unit 261 which coacts with the turret assembly 260 for disconnecting the power feed drive to the cutter bar at the desired time is carried in a housing 283, which is mounted on the spindle holder 110 for movement longitudinally in unison therewith. Within the housing 283, the automatic positioning unit (Figs. 17-19) includes a normally open switch 284 of the small, precision, snap-acting type. Switch 284 is controlled by its reciprocatory operating plunger 285 such that when this plunger is depressed switch 284 is closed and causes the solenoid 214 to be energized. An angularly movable actuating lever 286 attached to shaft 287 coacts with the switch plunger 285 to close the switch when shaft 287 is turned in one direction. Shaft 287 is supported for rotary movement within the housing 283 by spaced ball bearing assemblies 288, 289 (Fig. 17).

Outside the housing 283, the shaft 287 carries a lever 290, which is positioned to engage the trip dog carried in the lowermost way of the turret when the spindle holder 110 moves during the power feed drive. As best seen in Fig. 14, when this engagement with the trip dog occurs, the lever 290 is displaced angularly clockwise in Fig. 14 to turn the shaft 287 and thereby cause actuating lever 286 to close switch 284.

At the same time, another lever 291 attached to shaft 287 is turned to depress the operating plunger 292 of the dial indicator gage 293, which gives a visual indication to the operator the position at which the power feed drive to the spindle holder has been stopped. The final manual feed of the cutter bar by means of the hand wheel 120 may be controlled in accordance with the gage 293, which preferably is calibrated in terms of the linear feed movement of the cutter bar.

The above-described turret mechanism is used where it is intended to produce a plurality of identical work pieces having the same cuts therein. The first of these work pieces is machined in the described manner, using the dial assembly 6 to produce cuts of the desired depth on this work piece. During the machining of this work piece, at the completion of each of these cuts, a corresponding one of the turret trip dogs is positioned along its turret way to engage the trip lever 290 to close switch 284. Thus, the position of each of these turret trip dogs corresponds to a cut of predetermined depth on the first work piece, and these cuts can be duplicated on successive work pieces simply by turning the turret to position the turret trip dog which corresponds to a particular cut at the underside of the turret, for engagement with the trip lever 290 after the spindle holder has been fed a depth corresponding to the desired depth of cut.

The automatic positioning unit 261 also contains a normally-open switch 300 whose operating button 301 is positioned to be actuated by a reciprocatory plunger 302 (Fig. 19) which projects above the housing of the positioning unit. A coil spring 303 engages the plunger 302 to position its upper outer end above the top wall of this housing. The slide 132 carries a pair of fixed, spaced trip dogs 304 and 305 which are positioned to engage the upper end of the plunger 302. The function of these trip dogs and this switch is to disconnect the power drive to the spindle holder 110 in either extreme limit of movement of the spindle holder. As described in detail hereinafter, switch 300 is arranged to control the energization of solenoid 214 to interrupt the power drive to the spindle holder when the spindle holder moves either to its extreme limit of forward movement (at which plunger 302 is engaged by trip dog 304 to close switch 300) or its extreme limit of reverse movement (at which plunger 302 is engaged by trip dog 305 to close switch 300). Also, the rapid traverse motor 176 is controlled by switch 300 such that this motor is de-energized automatically in response to the closing of switch 300. Thus, switch 300 cooperated with the trip dogs 304 and 305 to stop the movement of the spindle holder 110 at either extreme limit of movement whether the rapid traverse drive from motor 176 or the power feed drive from spindle 31 is in effect.

*Circuit diagram for automatic positioning control for spindle holder*

Fig. 20 shows in simplified form the wiring diagram of the control mechanism for the automatic positioning of the spindle holder.

Referring to this figure, the lines 306 and 307 are connected across a suitable source of electric power. From line 306 a line 308 leads to the coil 309 of a relay, indicated generally at 310. From the opposite side of this coil a line 311 leads to a parallel combination of the normally open switches 284 and 228, this parallel combination of switches being connected in series with the relay coil 309 across the power lines 306 and 307. A normally open set of contacts 312 of the single pole, double throw switch 300 is also connected in series with relay coil 309 across the power lines 306 and 307.

Also connected across the power source is a series circuit which includes the solenoid 214 and the normally open contacts 313 of the relay 310.

In like manner, the field coil of motor 176, switch 186, and the normally closed set of contacts 314 of switch 300 are connected in series across the power source.

In the operation of this system, motor 176 is normally de-energized because switch 186 is open, solenoid 214 is normally de-energized because the relay contacts 313 are open, and relay coil 309 is normally de-energized because switches 228 and 284 and the normally open contacts 312 of switch 300 are open.

To initiate the rapid traverse movement of the spindle holder 110, the lever 182 is manipulated as described to close switch 186 and complete a circuit for the energization of the rapid traverse motor 176. In the event that during the rapid traverse movement the spindle holder 110 approaches either of its extreme limits of movement along slide 132, the switch 300 will be actuated by the respective trip dog 304 or 305 to open its normally closed contacts 314 and de-energize the rapid traverse motor 176, thereby interrupting the drive to the spindle holder. At the same time, the normally open contacts 312 of switch 300 are closed, thereby completing an energization circuit for the coil 309 of relay 310. This causes the relay contacts 313 to close and solenoid 214 is thereby energized and disconnects the clutch 76 to interrupt the power feed drive to the spindle holder. Thus, both the rapid traverse drive and the power feed drive to the spindle holder are disconnected automatically in response to movement of the spindle holder 110 to either extreme limit of movement.

Should either the switch 228 (controlled by the trip dog 220 mounted on the outer dial 153 of the dial assembly 6) or the switch 284 (controlled by the turret trip dogs) be closed, an energization circuit is completed for the coil 309 of relay 310. This effects energization of the solenoid 214, as described, and causes the power feed drive to the spindle holder 110 to be disconnected. In this manner, both the dial-controlled switch 228 and the turret-controlled switch 284 are operative automatically to effect automatic stopping of the spindle holder 110 as described above.

While in the foregoing description and in the accompanying drawings there has been disclosed a specific preferred embodiment of the present invention, it is to be understood that various modifications, omissions and refinements departing from the disclosed embodiment of the invention may be adopted without departing from the spirit and scope of this invention.

I claim:

1. In a machine tool having a work support for supporting a work piece, a spindle for supporting a cutting tool to engage the work piece, a spindle holder for supporting the spindle for axial movement thereof toward and from the work piece, and a power drive for feeding the spindle holder toward and from the work piece: a spindle feed control mechanism comprising, in combination, a manual drive for the final feed movement of the cutting tool, a first calibrated indicator dial connected to said power drive and said manual drive to be turned thereby for indicating the distance of axial feed of the spindle holder, a second calibrated indicator dial normally disconnected from said power drive and adapted to be connected to said power drive to be turned thereby after the cutting tool initially engages the work piece, a trip dog carried by said second dial, said second dial being mounted to permit the position of said trip dog to be preset to a predetermined location before connecting the second dial to said power drive, a solenoid-operated clutch controlling the connection of the power drive to the spindle holder, a switch controlling the energization of the solenoid for said clutch, a switch operator positioned to be engaged by said trip dog to operate said switch for disconnecting the power drive from the spindle holder in response to turning of the second dial a predetermined amount from said power drive as the cutting tool is fed by the power drive a predetermined distance into the work piece, a second switch for controlling the energization of said solenoid for operating said solenoid-operated clutch, a second switch operator for said second switch, a turret member having a multiple of turret faces and mounted for rotative adjustment on said spindle holder, and a trip dog adjustably mounted on each turret face, the turret faces and trip dogs being arranged so that the turret may be adjustably positioned to bring any selected trip dog into operating relation to said second switch operator for operation thereof responsive to movement of the spindle holder toward the work piece to actuate the second switch operator to stop the power drive to the spindle holder after the spindle holder has moved a predetermined distance toward the work piece.

2. In a machine tool having a work support for supporting a work piece, a spindle for supporting a cutting tool to engage the work piece, a spindle holder for supporting the spindle for axial movement thereof toward and from the work piece, and a power drive for feeding the spindle holder axially toward and from the work piece: a spindle feed control mechanism comprising, in combination, a first calibrated indicator dial connected to said power drive for indicating the distance of axial feed of the spindle holder, a second calibrated indicator dial normally disconnected from said power drive and adapted to be connected to said power drive to be turned thereby after the cutting tool initially engages the work piece, a trip dog carried by said second dial, said second dial being mounted to permit the position of said trip dog to be preset to a predetermined location before connecting the second dial to said power drive, a clutch controlling the connection of the power drive to the spindle holder, a switch controlling the engagement of said clutch, a switch operator positioned to be engaged by said trip dog to operate said switch for disconnecting the power drive from the spindle holder in response to turning of the second dial a predetermined amount from said power drive as the cutting tool is fed by the power drive a predetermined distance into the work piece, a second switch operator for said clutch, a turret member having a multiple of turret faces and mounted for rotative adjustment on said spindle holder, and a trip dog adjustably mounted on each turret face, the turret faces and trip dogs being arranged so that by rotative adjustment of the turret member any selected trip dog may be positioned in a single operating plane, said second switch operator being positioned in said plane to be operated by any selected trip dog responsive to movement of the spindle holder toward the work piece to actuate said second switch operator to stop the power drive to the spindle holder after the spindle holder has moved a predetermined distance toward the work piece.

3. In a machine tool having a work support for supporting a work piece, a spindle for supporting a cutting tool to engage the work piece, a spindle holder for supporting the spindle for axial movement thereof toward and from the work piece, and a power drive for feeding the spindle holder axially toward and from the work piece: a spindle feed control mechanism comprising, in combination, a solenoid-operated clutch controlling the connection of the power drive to the spindle holder, a switch controlling the energization of the solenoid for said solenoid-operated clutch, a turret member having a multiple of turret faces and mounted for rotative adjustment on said spindle holder, a trip dog adjustably mounted on each turret face, the turret faces and trip dogs being arranged so that by rotative adjustment of the turret member any selected trip dog may be positioned in a single operating plane, and a single switch operator for said solenoid switch positioned in said plane to be operated by any selected trip dog responsive to movement of the spindle holder toward the work piece to actuate the switch operator to stop the power drive to the spindle holder after the spindle holder has moved a predetermined distance toward the work piece.

4. In a machine tool having a work support for supporting a work piece, a spindle for supporting a cutting tool to engage the work piece, a spindle holder for supporting the spindle for axial movement thereof toward and from the work piece, and a power drive for feeding the spindle holder axially toward and from the work piece: a spindle feed control mechanism comprising, in combination, a clutch controlling the connection of the power drive to the spindle holder, a switch controlling the engagement of said clutch, a turret member having a multiple of turret faces and mounted for rotative adjustment on said spindle holder, and a trip dog adjustably mounted on each turret face, the turret faces and trip dogs being arranged so that by rotative adjustment of the turret member any selected trip dog may be positioned in a single operating plane, said switch operator being positioned in said plane to be operated by any selected trip dog responsive to movement of the spindle holder toward the work piece to actuate said switch operator to stop the power drive to the spindle holder after the spindle holder has moved a predetermined distance toward the work piece.

References Cited in the file of this patent

UNITED STATES PATENTS

| | | |
|---|---|---|
| 2,350,174 | Lucas et al. | May 30, 1944 |
| 2,358,896 | Walter | Sept. 26, 1944 |
| 2,387,820 | Armitage et al. | Oct. 30, 1945 |
| 2,391,398 | DeVlieg | Dec. 25, 1945 |
| 2,592,920 | Lovely et al. | Apr. 15, 1952 |